United States Patent
Zhang

(10) Patent No.: US 8,787,014 B2
(45) Date of Patent: Jul. 22, 2014

(54) SERVER WITH IMPROVED LAYOUT

(75) Inventor: Xin-Ping Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 136 days.

(21) Appl. No.: 13/288,904

(22) Filed: Nov. 3, 2011

(65) Prior Publication Data

US 2013/0100602 A1    Apr. 25, 2013

(30) Foreign Application Priority Data

Oct. 21, 2011 (CN) ............................................ 2011

(51) Int. Cl.
 *H05K 7/20* (2006.01)
(52) U.S. Cl.
 USPC ........ 361/679.5; 361/695; 361/720; 361/752; 454/184; 174/547
(58) Field of Classification Search
 USPC ................ 361/676–678, 679.46–679.54, 361/688–722, 748, 752, 760–761, 831
 See application file for complete search history.

(56) References Cited

U.S. PATENT DOCUMENTS

| | | | | |
|---|---|---|---|---|
| 5,860,291 | A * | 1/1999 | Johnson et al. | 62/259.2 |
| 6,504,718 | B2 * | 1/2003 | Wu | 361/695 |
| 6,704,196 | B1 * | 3/2004 | Rodriguez et al. | 361/679.33 |
| 6,987,674 | B2 * | 1/2006 | El-Batal et al. | 361/788 |
| 7,295,436 | B2 * | 11/2007 | Cheon | 361/699 |
| 7,430,117 | B2 * | 9/2008 | Shabany | 361/695 |
| 7,894,191 | B2 * | 2/2011 | Tsuchiya | 361/695 |
| 8,068,340 | B1 * | 11/2011 | Nguyen et al. | 361/695 |
| 8,081,457 | B2 * | 12/2011 | Guan | 361/695 |
| 8,248,783 | B2 * | 8/2012 | Huang | 361/679.5 |
| 8,248,792 | B2 * | 8/2012 | Wei | 361/692 |
| 8,254,108 | B2 * | 8/2012 | Chang et al. | 361/679.36 |
| 8,331,087 | B2 * | 12/2012 | Wei | 361/679.5 |
| 2008/0192431 | A1 * | 8/2008 | Bechtolsheim | 361/695 |

* cited by examiner

*Primary Examiner* — Courtney Smith
(74) *Attorney, Agent, or Firm* — Novak Druce Connolly Bove + Quigg LLP

(57) ABSTRACT

A server includes a chassis, a motherboard, a number of data storage devices, a number of system fans, and a power supply mounted in the chassis. The system fans generate an airflow flowing through the chassis, from a front portion of the chassis to a rear portion of the chassis. The power supply includes a power fan causing an airflow directed rearwards through the front portion of the chassis to prevent a disturbance with the airflow from the system fans.

1 Claim, 2 Drawing Sheets

SERVER WITH IMPROVED LAYOUT

BACKGROUND

1. Technical Field

The present disclosure relates to a server layout.

2. Description of Related Art

Referring to FIG. 1, a server generally includes a chassis 21, a motherboard 22, a plurality of data storage devices 23, a plurality of system fans 24, and a power supply 25 mounted in the chassis 21. When the system fans 24 operate, air outside the chassis 21 are driven to flow into the chassis 21 through a front end of the chassis 21 to be heated, and the heated air are expelled out of the chassis 21 through a rear end of the chassis 21 to avoid the heated air blowing forward to an operator in front of the server. The power supply 25 includes a connection end 250 to which a power cord 26 is connected, and a power fan 251 expelling air out of the power supply 25 from the connection end 250. The power supply 25 is generally arranged in the rear portion of the chassis 21 to direct the connection end 250 rearwards. Therefore, the airflow from the power fan 251 is prevented from disturbing the airflow from the system fans 24. However, if a power source 201 is arranged in front of the chassis 21, the power cord 26 has to be elongated and extend through the chassis 21 to connect the power source 201 and the power supply 25. The elongated power cord 26 brings an increasing cost, and an electromagnetic interference problem.

BRIEF DESCRIPTION OF THE DRAWINGS

Many aspects of the present embodiments can be better understood with reference to the following drawing. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
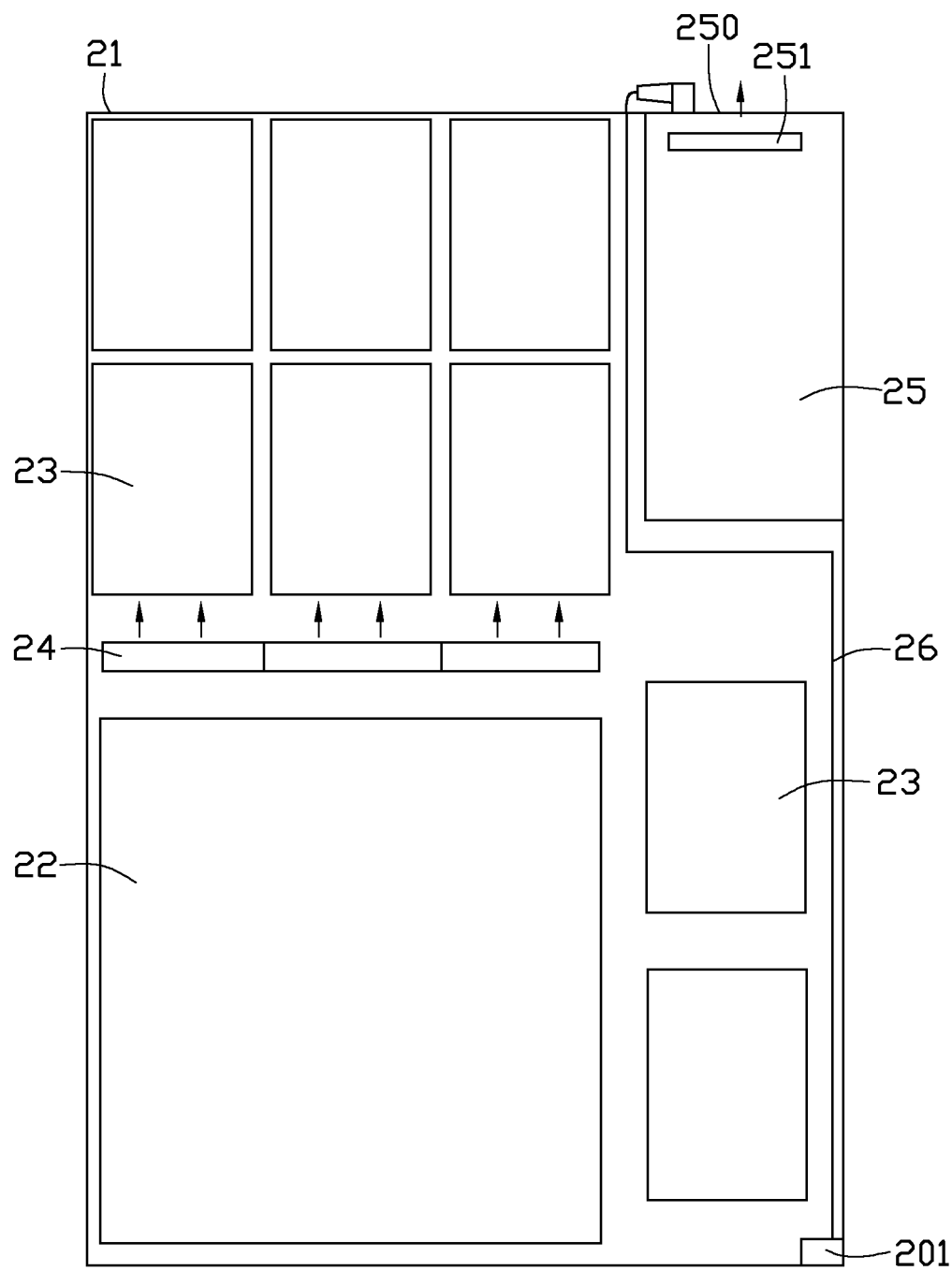
FIG. 1 is a plane view of a layout of a related art server.
Figure 2:
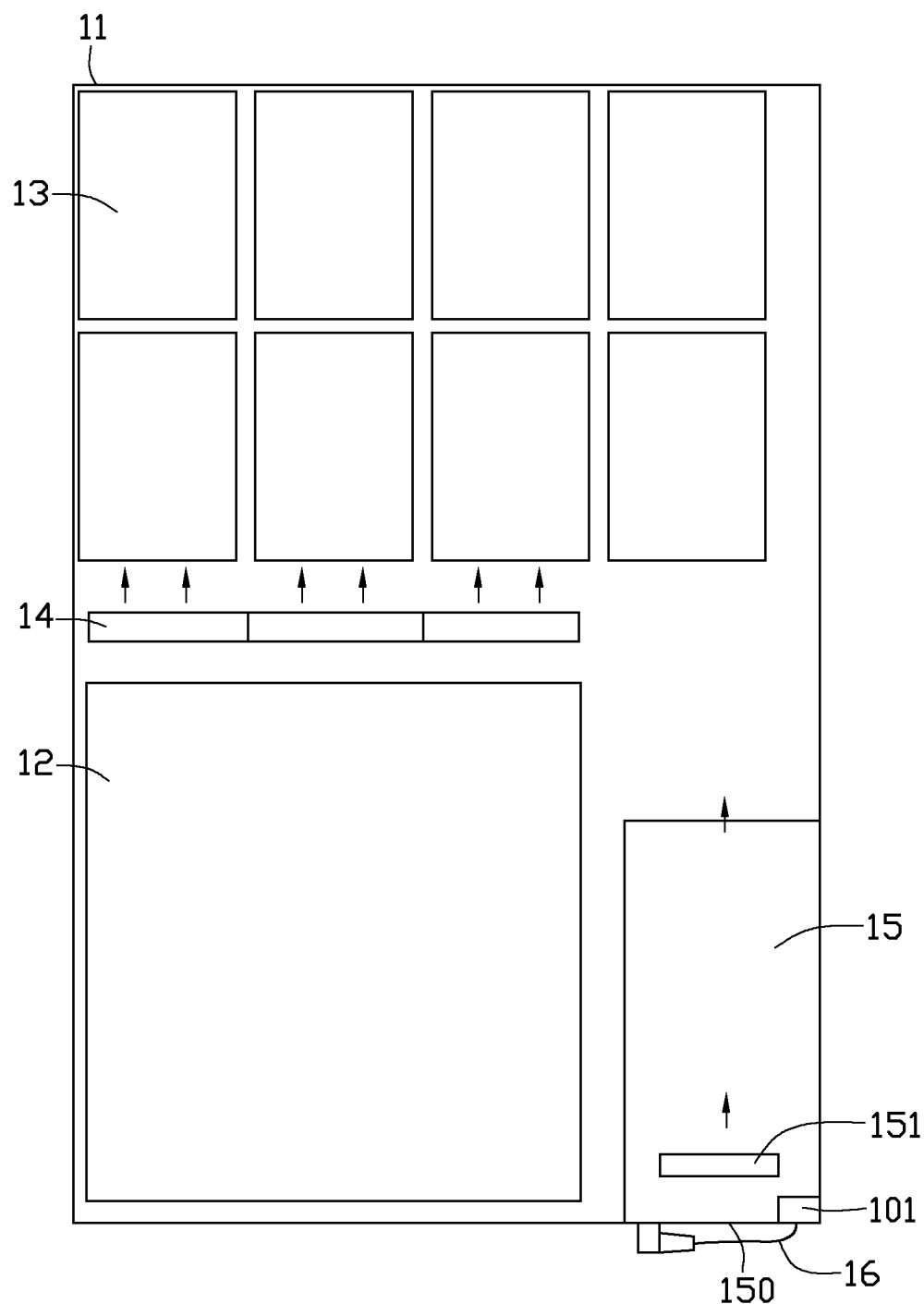
FIG. 2 is a plane view of a layout of an exemplary embodiment of a server.

Referring to FIG. 2, an exemplary embodiment of a server includes a chassis 11, and a motherboard 12, a plurality of data storage devices 13, a plurality of system fans 14, and a power supply 15 mounted in the chassis 11.

The motherboard 12 is arranged in a left front portion of the chassis 11, and includes a plurality of electronic units, such as central processing units, memories, and chipsets (not shown).

The data storage devices 13 are arranged in a rear portion of the chassis 11.

The system fans 14 are arranged between the data storage devices 13 and the motherboard 12 to generate an airflow flowing through the chassis 11 from the front portion of the chassis 11 to the rear portion of the chassis 11.

The power supply 15 is arranged in a right front portion of the chassis 11, beside the motherboard 12. The power supply 15 includes a connection end 150 directing forwards, and a power fan 151, which absorbs air into the power supply 151 from the front end of the chassis 11 for cooling the power supply 15.

In use, the power supply 15 is connected to a power source 101 in a right front corner of the chassis 11 with a power cord 16. Since the power supply 15 is adjacent to the right front portion of the chassis 11, the power cord 16 is prevented from being elongated and extending through the chassis 11. At the same time, the airflow from the power fan 151 directs rearwards to prevent a disturbance with the airflow from the system fans 14.

It is to be understood, however, that even though numerous characteristics and advantages of the embodiment have been set forth in the foregoing description, together with details of the structure and function of the embodiment, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A server comprising:
   a chassis;
   a motherboard mounted in the chassis;
   a plurality of data storage devices mounted in the chassis;
   a plurality system fans mounted in the chassis to generate an airflow flowing through the chassis, from a front portion of the chassis to a rear portion of the chassis;
   a power supply mounted in the chassis and arranged in the front portion of the chassis, and comprising a power fan generating an airflow directed rearwards through the front portion of the chassis;
   wherein the motherboard is arranged in a left front portion of the chassis, the plurality of data storage devices is arranged in the rear portion of the chassis, the plurality of system fans is arranged between the motherboard and the plurality of data storage devices.

* * * * *